(12) United States Patent
Struhsaker et al.

(10) Patent No.: US 7,075,967 B2
(45) Date of Patent: Jul. 11, 2006

(54) WIRELESS COMMUNICATION SYSTEM USING BLOCK FILTERING AND FAST EQUALIZATION-DEMODULATION AND METHOD OF OPERATION

(75) Inventors: Paul F. Struhsaker, Plano, TX (US); Russell C. McKown, Richardson, TX (US)

(73) Assignee: Raze Technologies, Inc., Plano, TX (US)

( * ) Notice: Subject to any disclaimer, the term of this patent is extended or adjusted under 35 U.S.C. 154(b) by 484 days.

(21) Appl. No.: 09/838,810

(22) Filed: Apr. 20, 2001

(65) Prior Publication Data

US 2002/0086707 A1   Jul. 4, 2002

Related U.S. Application Data

(60) Provisional application No. 60/262,712, filed on Jan. 19, 2001.

(51) Int. Cl.
*H04B 1/69* (2006.01)
*H04B 1/707* (2006.01)
*H04B 1/713* (2006.01)

(52) U.S. Cl. .................. 375/130; 375/260; 375/343

(58) Field of Classification Search ............ 375/130, 375/219, 295
See application file for complete search history.

(56) References Cited

U.S. PATENT DOCUMENTS

| | | | |
|---|---|---|---|
| 5,638,371 A | 6/1997 | Raychaudhuri et al. ..... 370/347 |
| 5,684,791 A | 11/1997 | Raychaudhuri et al. ..... 370/278 |
| 5,694,424 A | 12/1997 | Ariyavisitakul ............. 375/233 |
| 5,809,086 A | 9/1998 | Ariyavisitakul ............. 375/332 |
| 5,815,529 A * | 9/1998 | Wang ........................ 375/285 |
| 5,835,526 A * | 11/1998 | Juntti ........................ 375/233 |
| 5,991,292 A | 11/1999 | Focsaneanu et al. ........ 370/352 |
| 5,991,308 A * | 11/1999 | Fuhrmann et al. ..... 370/395.53 |
| 6,144,697 A * | 11/2000 | Gelfand et al. ............. 375/233 |

(Continued)

FOREIGN PATENT DOCUMENTS

GB    2 302 777    1/1997

(Continued)

OTHER PUBLICATIONS

Webster, M.; "Frequency-Domain Techniques for the Cyclostationary Signals Encountered in Fractionally-Spaced Equalizers"; IEEE International Conference on Acoustic, Speech and Signal Processing; Publication date Mar. 23, 1992; XP000467291; pp. 705-708.

(Continued)

*Primary Examiner*—Chieh M. Fan
*Assistant Examiner*—Erin M. File

(57) ABSTRACT

There is disclosed a transceiver for use in a base station of a fixed wireless network that communicates with a plurality of subscriber transceivers via time division duplex (TDD) channels. The transceiver comprises: 1) a receiver front-end for receiving data burst transmissions from the plurality of subscriber transceivers in an uplink portion of a TDD channel, wherein the receiver front-end demodulates the received data burst transmissions into a digital baseband signal in-phase (I) signal and a digital baseband quadrature (Q) signal; 2) a first frequency domain feedforward equalization filter for receiving the I signal; 3) a second frequency domain feedforward equalization filter for receiving the Q signal; 4) an adder for producing a combined symbol estimate sequence; 5) a slicer for receiving and quantizing the combined symbol estimate sequence; and 6) a time domain feedback filter for generating a symbol correction sequence.

18 Claims, 5 Drawing Sheets

U.S. PATENT DOCUMENTS

| | | | |
|---|---|---|---|
| 6,188,873 B1 | 2/2001 | Wickman et al. | 455/11.1 |
| 6,643,321 B1 * | 11/2003 | Genossar et al. | 375/219 |
| 6,650,624 B1 * | 11/2003 | Quigley et al. | 370/252 |
| 6,661,857 B1 * | 12/2003 | Webster et al. | 375/350 |
| 2002/0070796 A1 | 6/2002 | Gay-Bellile et al. | |

FOREIGN PATENT DOCUMENTS

| | | |
|---|---|---|
| WO | WO 97/09781 | 3/1997 |
| WO | WO 9804073 A2 * | 1/1998 |

OTHER PUBLICATIONS

Golberg, S., et al.; "Joint Carrier Recovery and Data Equalization Using Frequency Domain Techniques"; European Signal Processing Conference; Publication date Mar. 18, 1990; XP000365920; pp. 1823-1826.

Ready, M., et al.; "Architecture Considerations for Frequency Domain Adaptive Equalizers"; Asilomar Conference on Signals, Systems and Computers, Oct. 30, 1989; XP000217207; pp. 687-691.

* cited by examiner

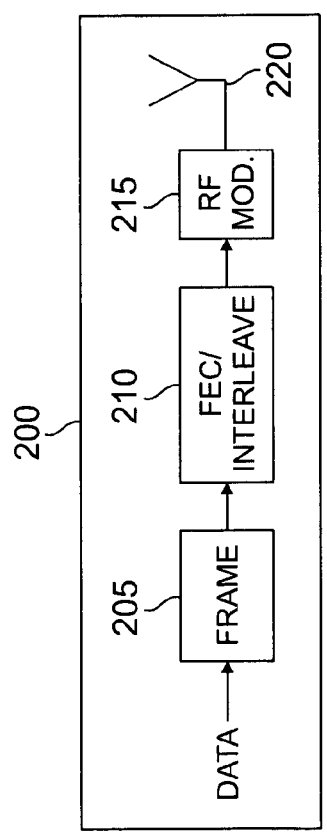
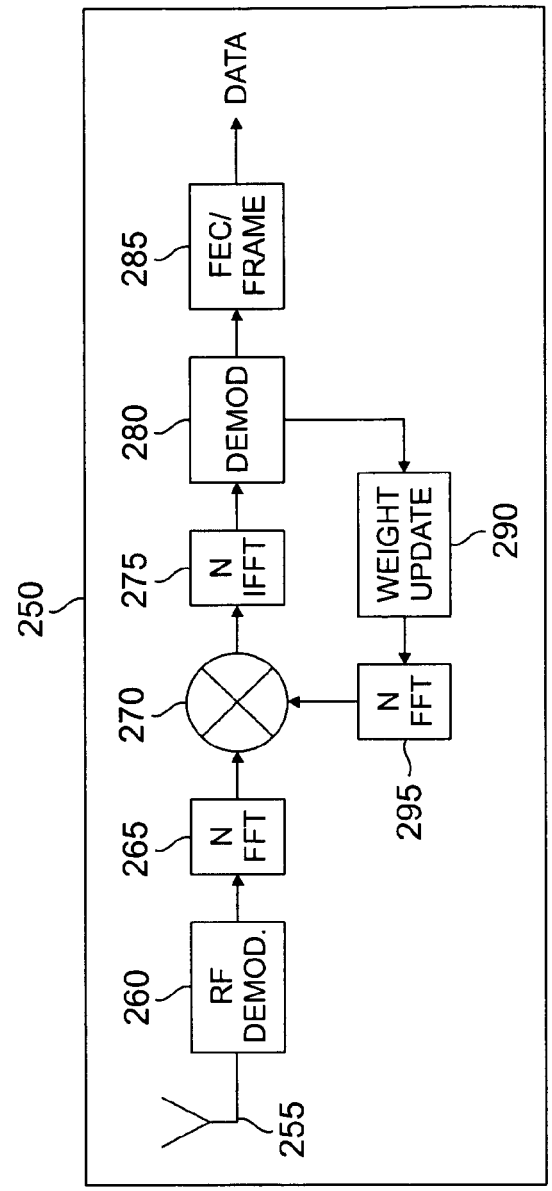
FIG. 2A (PRIOR ART)
FIG. 2B (PRIOR ART)

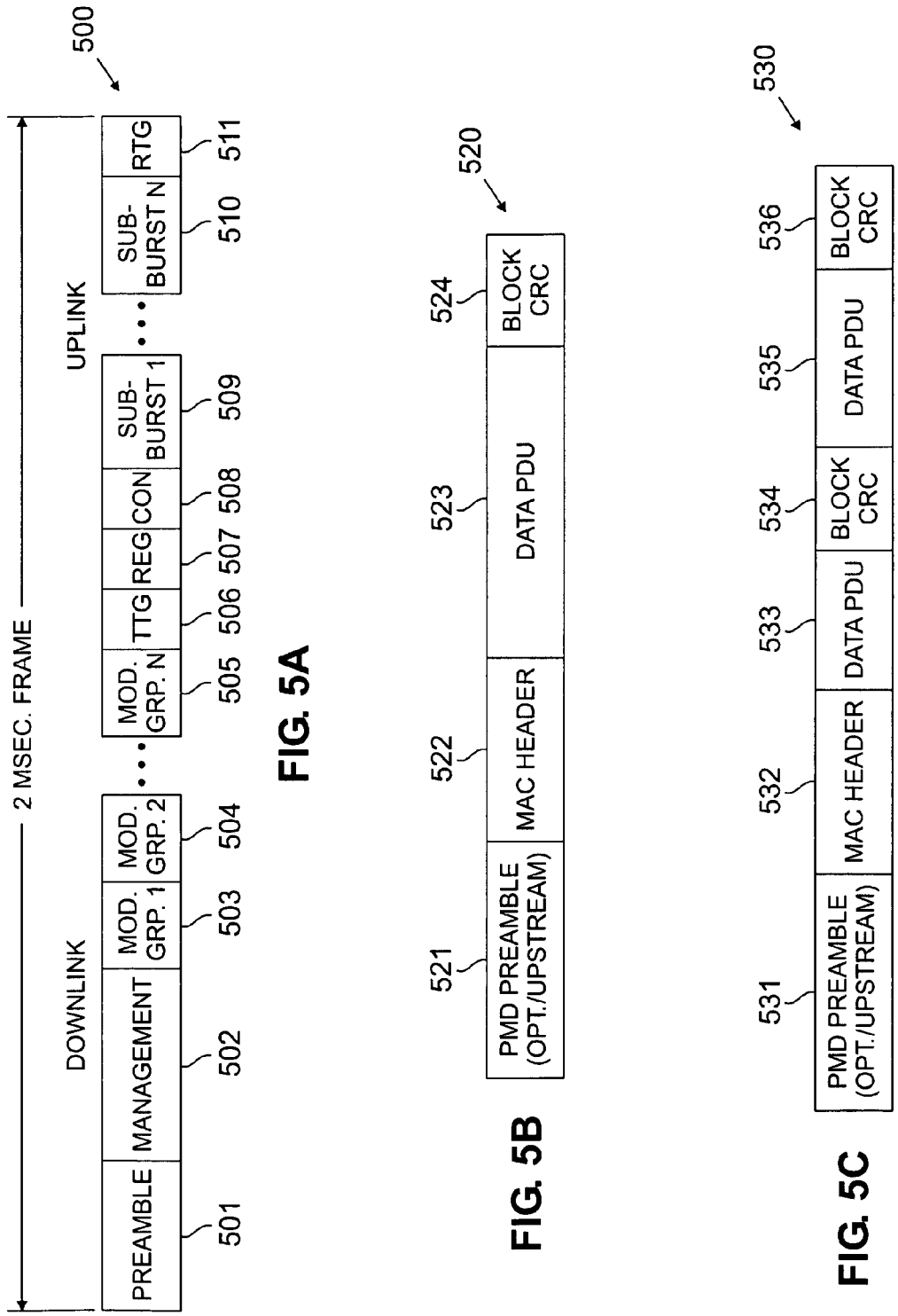

WIRELESS COMMUNICATION SYSTEM USING BLOCK FILTERING AND FAST EQUALIZATION-DEMODULATION AND METHOD OF OPERATION

CROSS-REFERENCE TO RELATED APPLICATIONS

The present invention claims priority to U.S. Provisional Application Ser. No. 60/262,712 filed Jan. 19, 2001.

The present invention is related to those disclosed in the following United States Provisional and Non-Provisional Patent Applications:

1) Ser. No. 09/713,684, filed on Nov. 15, 2000, entitled "SUBSCRIBER INTEGRATED ACCESS DEVICE FOR USE IN WIIRELESS AND WIRELINE ACCESS SYSTEMS;"
2) Ser. No. 09/839,726, filed Apr. 20, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
3) Ser. No. 09/839,729, filed Apr. 20, 2001, entitled "APPARATUS AND METHOD FOR OPERATING A SUBSCRIBER INTERFACE IN A FIXED WIRELESS SYSTEM";
4) Ser. No. 09/839,719, filed Apr. 20, 2001, entitled "APPARATUS AND METHOD FOR CREATING SIGNAL AND PROFILES AT A RECEIVING STATION";
5) Ser. No. 09/838,910, filed Apr. 20, 2001, entitled "SYSTEM AND METHOD FOR INTERFACE BETWEEN A SUBSCRIBER MODEM AND) SUBSCRIBER PREMISES INTERFACES";
6) Ser. No. 09/839,509, filed Apr. 20, 2001, entitled "BACKPLANE ARCHITECTURE FOR USE IN WIRELESS AND WIRELINE ACCESS SYSTEMS";
7) Ser. No. 09/839,514, filed Apr. 20, 2001, entitled "SYSTEM AND METHOD FOR ON-LINE INSERTION OF LINE REPLACEABLE UNITS IN WIRELESS AND WIRELINE ACCESS SYSTEMS";
8) Ser. No. 09/839,512, filed Apr. 20, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
9) Ser. No. 09/839,259, filed Apr. 20, 2001, entitled "REDUNDANT TELECOMMUNICATION SYSTEM USING MEMORY EQUALIZATION APPARATUS AND METHOD OF OPERATION";
10) Ser. No. 09/839,457, filed Apr. 20, 2001, entitled "WIRELESS ACCESS SYSTEM FOR ALLOCATING AND SYNCHRONIZING UPLINIC AM) DOWNLINK OF TDD FRAMES AND METHOD OF OPERATION";
11) Ser. No. 09/839,075, filed Apr. 20, 2001, entitled "TDD FDD AIR INTERFACE";
12) Ser. No. 09/839,499, filed Apr. 20, 2001, entitled "APPARATUS, AND AN ASSOCIATED METHOD, FOR PROVIDING WLAN SERVICE IN A FIXED WIRELESS ACCESS COMMUNICATION SYSTEM";
13) Ser. No. 09/839,458, filed Apr. 20, 2001, entitled "WIRELESS ACCESS SYSTEM USING MULTIPLE MODULATION";
14) Ser. No. 09/839,456, filed Apr. 20, 2001, entitled "WIRELESS ACCESS SYSTEM AND ASSOCIATED METHOD USING MULTIPLE MODULATION FORMATS IN TDD FRAMES ACCORDING TO SUBSCRIBER SERVICE TYPE";
15) Ser. No. 09/838,924, filed Apr. 20, 2001, entitled "APPARATUS FOR ESTABLISHING A PRIORITY CALL IN A FIXED WIRELESS ACCESS COMMUNICATION SYSTEM;
16) Ser. No. 09/839,727, filed Apr. 20, 2001, entitled "APPARATUS FOR REALLOCATING COMMUNICATION RESOURCES TO ESTABLISH A PRIORITY CALL IN A FIXED WIRELESS ACCESS COMMUNICATION SYSTEM";
17) Ser. No. 09/839,734, filed Apr. 20, 2001, entitled "METHOD FOR ESTABLISHING A PRIORITY CALL IN A FIXED WIRELESS ACCESS COMMUNICATION SYSTEM";
18) Ser. No. 09/839,513, filed Apr. 20, 2001, entitled "SYSTEM AND METHOD FOR PROVIDING AN IMPROVED COMMON CONTROL BUS FOR USE IN ON-LINE INSERTION OF LINE REPLACEABLE UNITS IN WIRELESS AND WIRELINE ACCESS SYSTEMS";
19) Ser. No. 60/262,825, filed on Jan. 19, 2001, entitled "APPARATUS AND ASSOCIATED METHOD FOR OPERATING UPON DATA SIGNALS RECEIVED AT A RECEIVING STATION OF A FIXED WIRELESS ACCESS COMMUNICATION SYSTEM";
20) Ser. No. 60/262,698, filed on Jan. 19, 2001, entitled "APPARATUS AND METHOD FOR OPERATING A SUBSCRIBER INTERFACE IN A FIXED WIRELESS SYSTEM";
21) Ser. No. 60/262,827, filed on Jan. 19, 2001, entitled "APPARATUS AND METHOD FOR CREATING SIGNAL AND PROFILES AT A RECEIVING STATION";
22) Ser. No. 60/262,826, filed on Jan. 19, 2001, entitled "SYSTEM ANT) METHOD FOR INTERFACE BETWEEN A SUBSCRIBER MODEM AND SUBSCRIBER PREMISES INTERFACES";
23) Ser. No. 60/262,951, filed on Jan. 19, 2001, entitled "BACKPLANE ARCHITECTURE FOR USE IN WIRELESS AND WIRELINE ACCESS SYSTEMS";
24) Ser. No. 60/262,824, filed on Jan. 19, 2001, entitled "SYSTEM AND METHOD FOR ON-LINE INSERTION OF LINE REPLACEABLE UNITS IN WIRELESS AND WIRELINE ACCESS SYSTEMS";
25) Ser. No. 60/263,101, filed on Jan. 19, 2001, entitled "SYSTEM FOR COORDINATION OF TDD TRANSMISSION BURSTS WITHIN AND BETWEEN CELLS IN A WIRELESS ACCESS SYSTEM AND METHOD OF OPERATION";
26) Ser. No. 60/263,097, filed on Jan. 19, 2001, entitled "REDUNDANT TELECOMMUNICATION SYSTEM USING MEMORY EQUALIZATION APPARATUS AND METHOD OF OPERATION";
27) Ser. No. 60/273,579, filed Mar. 5, 2001, entitled "WIRELESS ACCESS SYSTEM FOR ALLOCATING AND SYNCHRONIZING UPLINK AND DOWNLINK OF TDD FRAMES AND METHOD OF OPERATION";
28) Ser. No. 60/262,955, filed Jan. 19, 2001, entitled "TDD FDD AIR INTERFACE";
29) Ser. No. 60/262,708, filed on Jan. 19, 2001, entitled "APPARATUS, AND AN ASSOCIATED METHOD, FOR PROVIDING WLAN SERVICE IN A FIXED WIRELESS ACCESS COMMUNICATION SYSTEM";
30) Ser. No. 60/273,689, filed Mar. 5, 2001, entitled "WIRELESS ACCESS SYSTEM USING MULTIPLE MODULATION";
31) Ser. No. 60/273,757, filed Mar. 5, 2001, entitled "WIRELESS ACCESS SYSTEM AND ASSOCIATED METHOD USING MULTIPLE MODULATION FOR- MATS IN TDD FRAMES ACCORDING TO SUB-
SCRIBER SERVICE TYPE";
32) Ser. No. 60/270,378, filed Feb. 21, 2001, entitled
"APPARATUS FOR ESTABLISHING A PRIORITY
CALL IN A FIXED WIRELESS ACCESS COMMUNICATION SYSTEM";
33) Ser. No. 60/270,385, filed Feb. 21, 2001, entitled
"APPARATUS FOR REALLOCATING COMMUNICATION RESOURCES TO ESTABLISH A PRIORITY
CALL IN A FIXED WIRELESS ACCESS COMMUNICATION SYSTEM"; and
34) Ser. No. 60/270,430, filed Feb. 21, 2001, entitled
"METHOD FOR ESTABLISHING A PRIORITY CALL
IN A FIXED WIRELESS ACCESS COMMUNICATION
SYSTEM".

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to communication network access systems and, more specifically, to a base station receiver in a fixed wireless access system.

BACKGROUND OF THE INVENTION

Telecommunications access systems provide voice, data, and multimedia transport and control between the central office (CO) of the telecommunications service provider and the subscriber (customer) premises. Prior to the mid-1970s, a subscriber was connected by phone lines (e.g., voice frequency (VF) pairs) directly to Class 5 switching equipment located in the central office of the telephone company. In the late 1970s, digital loop carrier (DLC) equipment was added to the telecommunications access architecture. The DLC equipment provided an analog phone interface, voice CODEC functions, digital data multiplexing, a transmission interface, and control and alarm functions remotely from the central office to cabinets located within business and residential locations for approximately 100 to 2000 phone line interfaces. This distributed access architecture greatly reduced line lengths to the subscriber and resulted in significant savings in both wire installation and maintenance. The reduced line lengths also improved communication performance on the line provided to the subscriber.

By the late 1980s, the limitations of data modem connections over voice frequency (VF) pairs were becoming obvious to both subscribers and telecommunications service providers. ISDN (Integrated Services Digital Network) was introduced to provide universal 128 kbps service in the access network. The subscriber interface is based on 64 kbps digitization of the VF pair for digital multiplexing into high speed digital transmission streams (e.g., T1/T3 lines in North America, E1/E3 lines in Europe). ISDN was a logical extension of the digital network that had evolved throughout the 1980s. The rollout of ISDN in Europe was highly successful. However, the rollout in the United States was not successful, due in part to artificially high tariff costs which greatly inhibited the acceptance of ISDN.

More recently, the explosion of the Internet and deregulation of the telecommunications industry have brought about a broadband revolution characterized by greatly increased demands for both voice and data services and greatly reduced costs due to technological innovation and intense competition in the telecommunications marketplace.

To meet these demands, high speed DSL (digital subscriber line) modems and cable modems have been developed and deployed. The DLC architecture was extended to provide remote distributed deployment at the neighborhood cabinet level using DSL access multiplexer (DSLAM) equipment. The increased data rates provided to the subscriber resulted in the upgrading of DLC/DSLAM transmission interfaces from T1/E3 interfaces (1.5/2.0 Mbps) to high-speed DS3 and OC3 interfaces. In a similar fashion, the entire telecommunications network backbone has undergone and is undergoing continuous upgrading to wideband optical transmission and switching equipment.

Similarly, wireless access systems have been developed and deployed to provide broadband access to both commercial and residential subscriber premises. Fixed wireless broadband systems use a group of transceiver base stations to cover a region in the same manner as the base stations of a cellular phone system. The base stations of a fixed wireless broadband system transmit forward channel (i.e., downstream) signals in directed beams to fixed location antennas attached to the residences or offices of subscribers. The base stations also receive reverse channel (i.e., upstream) signals transmitted by broadband access equipment at the subscriber premises.

Initially, the market for wireless access systems was driven by rural radiotelephony deployed solely to meet the universal service requirements imposed by government (i.e., the local telephone company is required to serve all subscribers regardless of the cost to install service). The cost of providing a wired connection to a small percentage of rural subscribers was high enough to justify the development and expense of small-capacity wireless local loop (WLL) systems.

Deregulation of the local telephone market in the United States (e.g., Telecommunications Act of 1996) and in other countries shifted the focus of fixed wireless access (FWA) system deployment from rural access to competitive local access in more urbanized areas. In addition, the age and inaccessibility of much of the older wired telephone infrastructure make FWA systems a cost-effective alternative to installing new, wired infrastructure. Also, it is economically more feasible to install FWA systems in developing countries where market penetration is limited (i.e., the number and density of users who can afford to pay for services is limited to a small percentage of the population) and where wired infrastructure cannot be installed profitably. In either case, broad acceptance of FWA systems requires that the voice quality and data integrity of FWA systems meet or exceed the performance of wired infrastructure.

Wireless access systems must address a number of unique operational and technical issues including:

1) Relatively high bit error rates (BER) compared to wire line or optical systems; and 2) Transparent operation with network protocols and protocol time constraints for the following protocols:
   a) ATM;
   b) Class 5 switch interfaces (domestic GR-303 and international V5.2);
   c) TCP/IP with quality-of-service QoS for voice over IP (VOIP) (i.e., RTP) and other H.323 media services; and
   d) Distribution of synchronization of network time out to the subscribers;

3) Increased use of voice, video and/or media compression and concentration of active traffic over the air interface to conserve bandwidth;

4) Switching and routing within the access system to distribute signals from the central office to multiple remote cell sites containing multiple cell sectors and one or more frequencies of operation per sector; and 5) Remote support and debugging of the subscriber equipment, including remote software upgrading and provisioning.

Unlike wireline systems (including optical) that operate at bit error rates (BER) of $10^{-11}$, wireless access systems have time varying channels that typically provide bit error rates of $10^{-3}$ to $10^{-6}$. The wireless physical (PHY) layer interface and the media access control (MAC) layer interface must provide modulation, error correction and ARQ protocol that can detect and, where required, correct or retransmit corrupted data so that the interfaces at the network and at the subscriber site operate at approximately wire line bit error rates.

RF propagation channels (i.e., links) between a subscriber transceiver and a base station transceiver may vary due to a number of link factors. The two most important factors are propagation loss and channel distortion. Depending of the type of channel, the propagation loss between a transmitter and a receiver increases beyond the best case line-of-sight (LOS) $R^2$ propagation losses to include distortion caused by multipath, shadowing, and diffraction.

Propagation paths may be characterized as line of sight (LOS), non-line of sight (non-LOS) with knife-edge diffraction (non-shadowed), and non-LOS with shadowing or obstruction. In a LOS propagation path, there is no obstruction within the Fresnel zone. The Fresnel zone is the area around the line of sight that radio waves spread into after the radio waves leave the antenna. As a rule of thumb, if at least 55% of the first Fresnel zone is clear, then there is no significant distortion. In a LOS propagation path, multipath may still be present. The path loss of a LOS propagation path is approximately $R^2$, where R is the path length.

In a non-LOS propagation path with knife-edge diffraction, a structure or terrain (e.g., hill) blocks the direct line of sight, but only partially blocks (i.e., non-shadowed) the Fresnel zone of the direct path. In this situation, RF waves diffracted around the obstruction (i.e., knife-edge diffraction) still reach the subscriber. In a non-LOS propagation path with knife-edge diffraction, the length of the propagation path is increased (excess path length), which increases the path loss beyond $R^2$, thereby including an additional diffraction loss component.

In a non-LOS propagation path with shadowing or obstruction, the direct line of sight and the associated Fresnel zone are blocked (shadowed) by a structure or terrain. In this situation, the path loss is a combination of normal path loss and penetration losses through the obstruction. Establishment of a link is still possible where the attenuation of the obstruction still allows enough residual signal power to be received by the subscriber equipment. However, prediction of the link characteristics under these conditions is difficult.

For frequencies below 11 gigahertz (GHz), the primary source of channel distortion is multipath reflection caused by reflection of the transmitted signal off objects (e.g., buildings, terrain) in the area. Multipath reflection causes the primary (direct path) signal and a number of delayed path signals to arrive at the receiver at different times. One way of describing the extent of multipath is to define the delay spread of the channel auto-correlation delay profile. The delay spread is defined as the difference in time between the arrival of the first signal ($H_1$ direct path) and the arrival of the last detectable signal ($H_3$ longest multipath) that is X dB below the power of the first signal.

Two important papers provide detailed studies of the delay spread in 2 GHZ and 2.5 GHZ channels across a number of different line-of-sight and non-line-of-sight channels. J. W. Porter and J. A. Thweat provided a study of multi-point microwave distribution system (MMDS) frequency propagation in a suburban environment ("Microwave Propagation Characteristics in the MMDS Frequency Band," Proceedings of the International Conference on Communications, New Orleans, June 2000). This study noted that a combination of directional transmit and receive antennas provided for root-mean-square (RMS) delay spread of less that on microsecond (1 usec.) in 90% of the link cases. The study also reported that lower antenna heights resulted in lower delay spread but also greater propagation loss due to non-line-of-sight conditions. A summary of the test results is provided below in TABLE 1.

TABLE 1

| Signal Path | Antenna Type | RMS Delay Spread Min. (usec.) | RMS Delay Spread Max. (usec.) | RMS Delay Spread Mean (usec.) |
|---|---|---|---|---|
| LOS | Direct. | 0.02 | 0.04 | 0.02 |
| LOS | Omni | 0.02 | 2.39 | 0.13 |
| Non-LOS | Direct. | 0.02 | 5.26 | 0.14 |
| Non-LOS | Omni | 0.02 | 7.06 | 0.37 |

A study by V. Erceg, D. G. Michelson and others provided a similar study at 2 GHZ ("A Model for Multipath Delay Profile for Fixed Wireless Channels," IEEE JSAC, Volume 17, No. 3 March 1999, pp. 399–410). In this study, delay spread (full time span, not RMS delay spread) of up to one microsecond (usec.) was detected for both omni and directional antennas.

Propagation loss effects the energy level of the signal and ultimately the modulation complexity that can be supported. Multipath and the resulting delay spread can result in distortions that make the signal impossible to demodulate regardless of received energy level, unless some correction technique to combat multipath is implemented. A number of multipath correction techniques are known, including 1) signal processing to perform channel equalization (inverse filtering), 2) directional antennas (limit sources of multipath), and 3) spatial diversity receivers (demodulation and coherent combination of one or more antenna-receiver sources).

The choice of modulation and associated signal processing (i.e., equalization techniques) impacts the complexity of both the digital baseband modem and the linearity of the RF transceiver. Common modulation schemes have been summarized by Falconer and Ariyavistakul in a submission to the IEEE 802.16.3 working group (D. Falconer and S. Ariyavistakuo, "Modulation and Equalization Criteria for 2 to 11 GHZ Fixed Broadband Wireless Systems," IEEE 802.16c-00/Sep. 13, 2000). These modulation schemes include: 1) orthogonal frequency division multiplexing (OFDM) based on a Fast Fourier Transform-Inverse Fast Fourier Transform (FFT/IFFT) implementation; 2) single carrier (SC) modulation with time domain adaptive equalization; and 3) single carrier modulation with frequency domain adaptive equalization.

There is a great deal of emphasis on OFDM modulation formats as opposed to single carrier modems that implement equalization. The support for OFDM modulation is based on the computational complexity of the equalizer being a linear function of delay spread in single carrier modems, while the computational complexity of the equalizer in an OFDM system is a log function of the delay spread using efficient FFT implementations. However, this benefit in computational complexity is gained at the cost of increased RF linearity, increased frequency sensitivity, and granularity problems in the OFDM systems.

Therefore, there is a need in the art for improved broadband wireless access equipment that is less expensive and more reliable than existing broadband wireless access equipment. In particular, there is a need in the art for base station receivers having very low bit error rates for use in broadband wireless access equipment. More particularly, there is a need for base station receivers having the computational complexity of OFDM systems without suffering the increased RF linearity, increased frequency sensitivity, and granularity problems associated with OFDM systems.

SUMMARY OF THE INVENTION

This present invention addresses the design of an equalizer-demodulator for burst digital communication signals received in multipath-impaired radio channels of a wireless communications system. The equalizer-demodulator in the invention employs fast equalization techniques with reduced computational load. These techniques include computationally efficient channel estimation and equalizer filter coefficient computation algorithms. The channel equalization uses 2/T fractionally spaced feedforward filters and sparse post-decision feedback filters. The odd and even feedforward filters are implemented as a single block frequency domain filter using an efficient Fast Fourier transform (FFT). The post-decision feedback filter of the present invention operates in the time domain using a sparsely populated coefficient vector to minimize computation without sacrificing the ability to compensate large multipath delays.

According to an advantageous embodiment of the present invention, the equalizer/demodulator is coupled with a Time Division Duplex (TDD) air interface of the wireless communications system. The air interface specifies that all subscriber transmission bursts have durations (i.e., number of symbols) equal to an integer number of FFT blocks. The advantageous embodiment of the present invention is also coupled with the air interface such that the TDD burst supports FFT block size preambles. These preambles consist of Constant Amplitude Zero Auto-Correlation (CAZAC) phase shift keying (PSK) training sequences. The inclusion of the preamble in the subscriber uplink is optional and under the command of the base station. This allows the base station equalizer-demodulator to track the multipath channels of individual subscribers while minimizing the preamble overhead.

The equalizer-demodulator according to the principles of the present invention provides the following advantages:

1. Yields high efficiency in terms of computational complexity.
2. Provides rapid channel estimation.
3. Provides required equalization of multipath channel.
4. May be adapted to any form of modulation. It is a general and powerful technique with wide application.
5. May be extended to include multiple antenna-multiple receiver channel architectures by including antenna combining weights as part of the cyclo-stationary channel descriptor.

Accordingly, it is an object of the present invention to provide a transceiver for use in a base station (BS) of a fixed wireless network capable of communicating with a plurality of subscriber transceivers via time division duplex (TDD) channels. According to an advantageous embodiment of the present invention, the BS transceiver comprises: 1) a receiver front-end capable of receiving data burst transmissions from the plurality of subscriber transceivers in an uplink portion of a TDD channel, wherein the receiver front-end demodulates the received data burst transmissions into a digital baseband signal in-phase (I) signal and a digital baseband quadrature (Q) signal; 2) a first frequency domain feedforward equalization filter capable of receiving the I signal and performing a Fast Fourier Transform on a block of N symbols in the I signal to produce a first symbol estimate sequence; 3) a second frequency domain feedforward equalization filter capable of receiving the Q signal and performing a Fast Fourier Transform on a block of N symbols in the Q signal to produce a second symbol estimate sequence; 4) an adder capable of receiving the first signal estimate sequence on a first input and the second signal estimate sequence on a second input and producing a combined symbol estimate sequence; 5) a slicer capable of receiving and quantizing the combined symbol estimate sequence to produce a sequence of decided symbols; and 6) a time domain feedback filter capable of receiving the sequence of decided symbols and generating a symbol correction sequence that is applied to a third input of the adder.

According to one embodiment of the present invention, the first frequency domain feedforward equalization filter is 2/T fractionally spaced, where T is a period of the block of the N symbols.

According to another embodiment of the present invention, the second frequency domain feedforward equalization filter is 2/T fractionally spaced, where T is a period of the block of the N symbols.

According to still another embodiment of the present invention, the time domain feedback filter comprises a delay line comprising D delay taps.

According to yet another embodiment of the present invention, the time domain feedback filter uses C feedback coefficients to generate the symbol correction sequence, where C is less than D.

According to a further embodiment of the present invention, the feedback filter is a RAKE filter.

According to a yet further embodiment of the present invention, the BS transceiver further comprises a channel estimation circuit capable of detecting a preamble sequence of symbols in at least one of the I and Q signals and producing therefrom a first plurality of feedforward coefficients usable by the first frequency domain feedforward equalization filter.

According to a still further embodiment of the present invention, the channel estimation circuit produces a second plurality of feedforward coefficients usable by the first frequency domain feedforward equalization filter.

According to one embodiment of the present invention, N=16.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIGS. 2A and 2B illustrate a conventional transmitter and a conventional receiver for use in a prior art wireless access network that implements single carrier frequency domain equalization (SC-DFE);

FIG. 5A illustrates an exemplary time division duplex (TDD) frame according to one embodiment of the present invention;

FIG. 5B illustrates an exemplary transmission burst containing a frame with a single forward error correction (FEC) block according to one embodiment of the present invention; and FIG. 5C illustrates an exemplary transmission burst containing a frame having multiple FEC blocks according to another embodiment of the present invention.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless access network.

Figure 1:
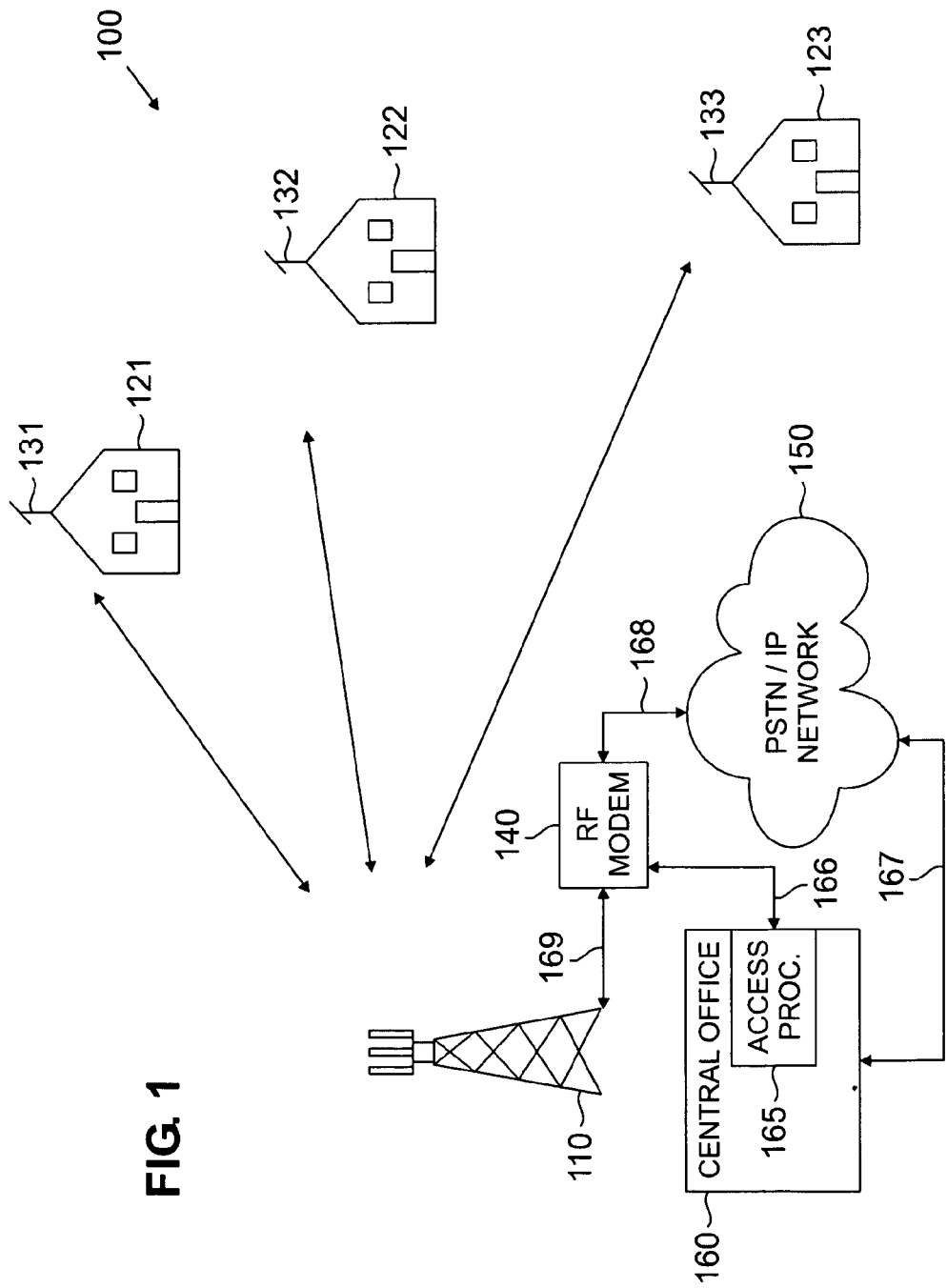
FIG. 1 illustrates exemplary fixed wireless access network according to one embodiment of the present invention.

FIG. 1 illustrates exemplary fixed wireless access network 100 according to one embodiment of the present invention. Fixed wireless network 100 comprises a plurality of transceiver base stations, including exemplary transceiver base station 110, that transmit forward channel (i.e., downlink or downstream) broadband signals to a plurality of subscriber premises, including exemplary subscriber premises 121, 122 and 123, and receive reverse channel (i.e., uplink or upstream) broadband signals from the plurality of subscriber premises. Subscriber premises 121–123 transmit and receive via fixed, externally-mounted antennas 131–133, respectively. Subscriber premises 121–123 may comprise many different types of residential and commercial buildings, including single family homes, multi-tenant offices, small business enterprises (SBE), medium business enterprises (MBE), and so-called "SOHO" (small office/home office) premises.

The transceiver base stations, including transceiver base station 110, receive the forward channel (i.e., downlink) signals from external network 150 and transmit the reverse channel (i.e., uplink) signals to external network 150. External network 150 may be, for example, the public switched telephone network (PSTN) or one or more data networks, including the Internet or proprietary Internet protocol (IP) wide area networks (WANs) and local area networks (LANs). Exemplary transceiver base station 110 is coupled to RF modem shelf 140, which, among other things, up-converts baseband data traffic received from external network 150 to RF signals transmitted in the forward channel to subscriber premises 121–123. RF modem shelf 140 also down-converts RF signals received in the reverse channel from subscriber premises 121–123 to baseband data traffic that is transmitted to external network 150.

RF modem shelf 140 comprises a plurality of RF modems capable of modulating (i.e., up-converting) the baseband data traffic and demodulating (i.e., down-converting) the reverse channel RF signals. In an exemplary embodiment of the present invention, each of the transceiver base stations covers a cell site area that is divided into a plurality of sectors. In an advantageous embodiment of the present invention, each of the RF modems in RF modem shelf 140 may be assigned to modulate and demodulate signals in a particular sector of each cell site. By way of example, the cell site associated with transceiver base station 110 may be partitioned into six sectors and RF modem shelf 140 may comprise six primary RF modems (and, optionally, a seventh spare RF modem), each of which is assigned to one of the six sectors in the cell site of transceiver base station 110. In another advantageous embodiment of the present invention, each RF modem in RF modem shelf 140 comprises two or more RF modem transceivers which may be assigned to at least one of the sectors in the cell site. For example, the cell site associated with transceiver base station 110 may be partitioned into six sectors and RF modem shelf 140 may comprise twelve RF transceivers that are assigned in pairs to each one of the six sectors. The RF modems in each RF modem pair may alternate modulating and demodulating the downlink and uplink signals in each sector.

RF modem shelf 140 is located proximate transceiver base station 110 in order to minimize RF losses in communication line 169. RF modem shelf 140 may receive the baseband data traffic from external network 150 and transmit the baseband data traffic to external network 150 via a number of different paths. In one embodiment of the present invention, RF modem shelf 140 may transmit baseband data traffic to, and receive baseband data traffic from, external network 150 through central office facility 160 via communication lines 166 and 167. In such an embodiment, communication line 167 may be a link in a publicly owned or privately owned backhaul network. In another embodiment of the present invention, RF modem shelf 140 may transmit baseband data traffic to, and receive baseband data traffic from, external network 150 directly via communication line 168 thereby bypassing central office facility 160.

Central office facility 160 comprises access processor shelf 165. Access processor shelf 165 provides a termination of data traffic for one or more RF modem shelves, such as RF modem shelf 140. Access processor shelf 165 also provides termination to the network switched circuit interfaces and/or data packet interfaces of external network 150. One of the principal functions of access processor shelf 165 is to concentrate data traffic as the data traffic is received from external network 150 and is transferred to RF modem shelf 140. Access processor shelf 165 provides data and traffic processing of the physical layer interfaces, protocol conversion, protocol management, and programmable voice and data compression.

The present invention comprises an equalizer-demodulator adapted for use in the receive path of transceiver base station 110. The equalizer-demodulator uses fast equalization techniques with reduced computational load to process burst digital communication signals received in multipath-impaired radio channels of fixed wireless access network 100. These techniques include computationally efficient channel estimation and equalizer filter coefficient computation algorithms.

To better illustrate the advantages of the present invention, prior art OFDM transceivers and single channel transceiver will be discussed briefly. FIGS. 2A and 2B illustrate conventional transmitter 200 and conventional receiver 250 for use in a prior art wireless access network that implements single carrier frequency domain equalization (SC-DFE).

Transmitter 200 comprises frame unit 205, forward error correction-interleave unit 210, RF modulator 215, and antenna 220. Frame unit 205 receives an incoming data stream in the transmit path and formats the incoming data into data frames for burst transmissions. Forward error correction-interleave unit 210 applies error correction codes and interleaves the data frame with N 1 other outgoing data frames. The interleaved baseband data is then up-converted by RF modulator 215 to a single RF carrier frequency and transmitted via antenna 220 to receiver 250.

Receiver 250 comprises a receive path and a feedback path. The receive path comprises antenna 255, RF demodulator 260, N Fast Fourier Transform (FFT) processors 265, mixer 270, N Inverse Fourier Transform (IFFT) processors 275, demodulator 280, and forward error correction (FEC)-frame processing block 285. The feedback path comprises weight update processor 290 and N Fast Fourier Transform (FFT) processors 295.

Figure 3A:
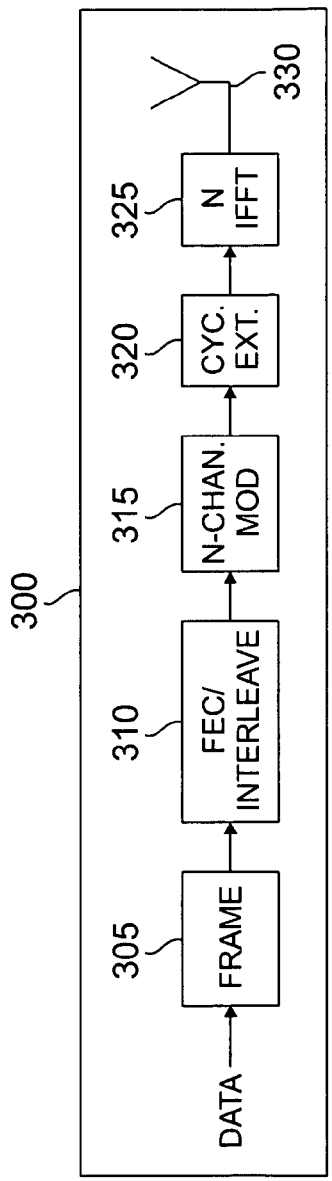
FIGS. 3A and 3B illustrate a conventional transmitter and a conventional receiver for use in a prior art wireless access network that implements orthogonal frequency domain multiplexing (OFDM) modulation.
Figure 3B:
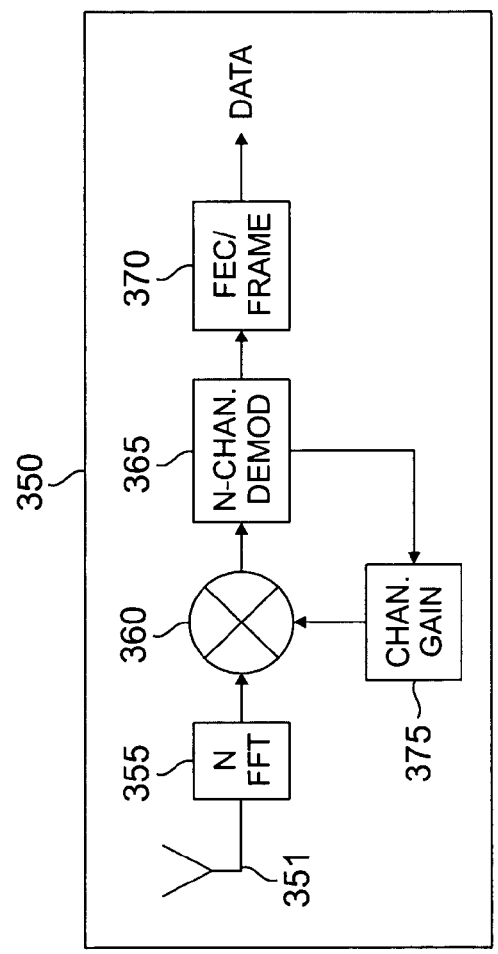

FIGS. 3A and 3B illustrate conventional transmitter 300 and conventional receiver 350 for use in a prior art wireless access network that implements orthogonal frequency domain multiplexing (OFDM) modulation. Transmitter 300 comprises frame unit 305, forward error correction-interleave unit 310, N-channel modulator 315, cyclic extensions unit 320, N IFFT processors 325 and antenna 330. Frame unit 305 receives an incoming data stream in the transmit path and formats the incoming data into data frames for burst transmissions. Forward error correction-interleave unit 310 applies error correction codes and interleaves the data frame with N−1 other outgoing data frames. The data frames are then modulated onto N subchannels by N-channel modulator 315. Cyclic extension unit 320 adds to each subchannel a guard space having the same length, L, as the channel impulse response to avoid intersymbol interference caused by the physical channel. The modulated bitstream is then passed through N IFFT processors 325, which superimposes the modulated signal onto a series of subcarriers, and is transmitted via antenna 330 to receiver 350.

Receiver 350 also comprises a receive path and a feedback path. The receive path comprises antenna 351, N Fast Fourier Transform (FFT) processors 355, mixer 360, N channel demodulators 365, and forward error correction (FEC)/frame processing block 370. The feedback path comprises channel gain controller 375.

OFDM and single carrier-frequency domain equalization (SC-FDE) are in reality duals of each other. An OFDM system essentially moves the initial FFT of a SC-FDE system from the transmitter to the receiver. Both systems implement weight multiplication of the individual bits. One difference is the use of N FFT processors 295 in the SC-FDE system to convert the time domain taps.

The computational load of this function can be greatly reduced as the maximum channel Doppler spread (rate of the change of the channel) is less than 2 Hz. The air interface can perform a decimated update in which the tap update if performed one time in N bursts. Typically, it is necessary to update at least 10 times the rate of change of the channel. This would set a minimum update rate of 50 millisecond (1/(10×2 Hz)). Given a 2 millisecond time division duplex (TDD) frame rate, updates may be limited to once every 25 frames. In practice, the transceiver base station to subscriber link may be updated at between 2 and 10 milliseconds based on reception of the start of frame message.

The use of FFT and block/frame oriented processing maximizes computational efficiency. An N tap complex signal time domain equalizer results in $2N^2$ real multiplies. This is the linear complexity argument so often presented by advocates of OFDM. TABLE 2 below illustrates the computational advantages of frequency domain equalization processing compared to the time domain processing. In addition to the raw computation improvement, the FFT/IFFT allows for a number of reduced complexity multiplications when based on an efficient radix 4 implementation.

TABLE 2

| FFT Size (N) | Complexity Ratio (FFT/Time Domain) |
| --- | --- |
| 32 | 1.2 |
| 64 | 0.69 |
| 128 | 0.38 |
| 256 | 0.21 |
| 512 | 0.12 |

In order to support either OFDM or SC modulation with a burst structure, it is necessary to organize the burst structure into integer numbers of FFT frames. In OFDM, this frame represents one symbol. In SC-FDE, this frame represents N symbols. A complete packet burst is composed of one or more FFT Frames. By adhering to a frame-based approach to the physical layer, a software defined radio can readily support either SC or OFDM modulation formats.

Figure 4:
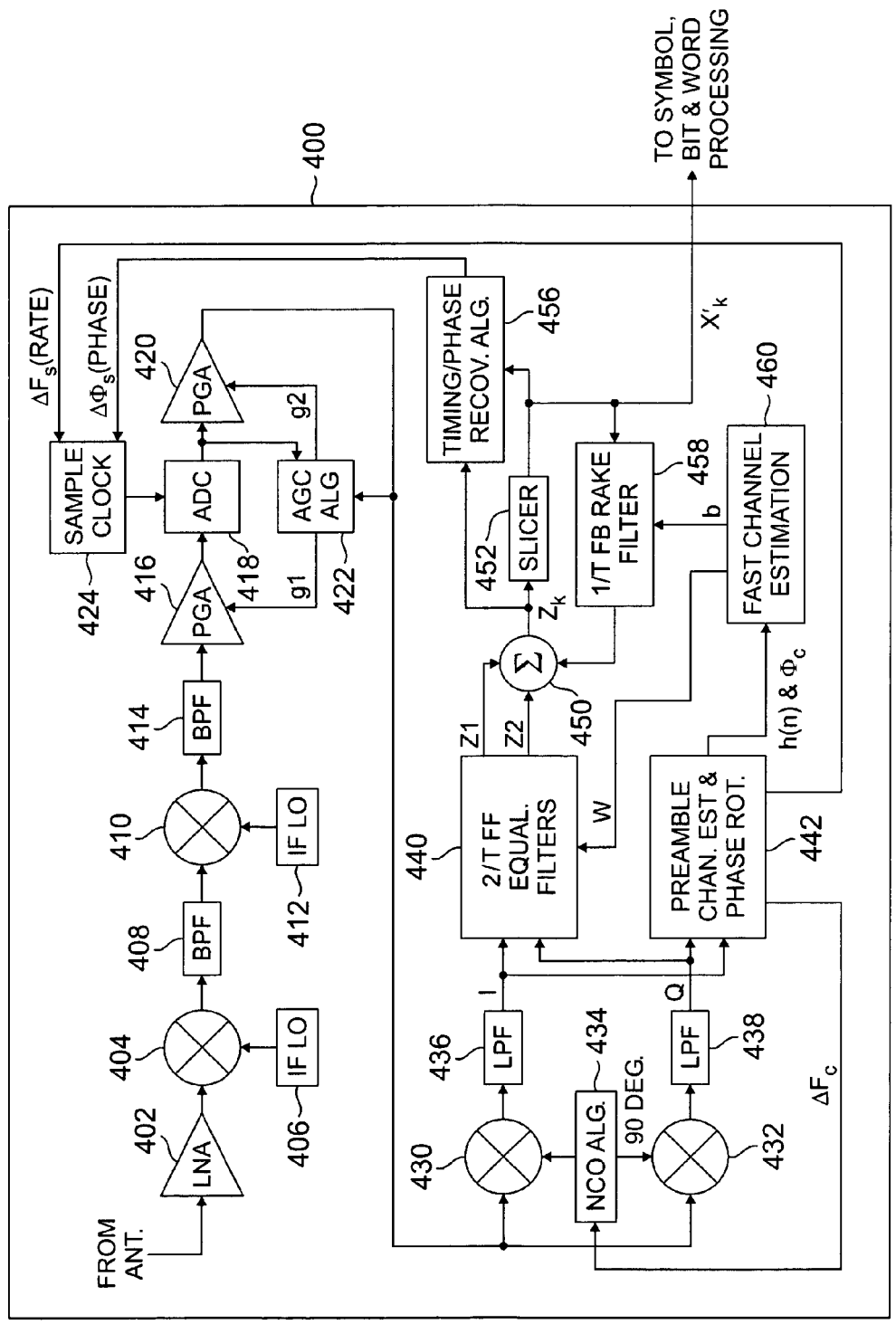
FIG. 4 illustrates a burst mode processing equalizer-demodulator for use in the RF modem of the exemplary transceiver base station according to one embodiment of the present invention.

FIG. 4 illustrates burst mode processing equalizer-demodulator 400 for use in RF modem shelf 140 of transceiver base station 110 according to one embodiment of the present invention. Equalizer-demodulator 400 comprises low noise amplifier 402, which receives and amplifies the incoming signals from the transmitters at the subscribers premises. The amplified RF signal is down-converted to a first intermediate frequency (IF1) signal by radio frequency (RF) mixer 404 and RF local oscillator (LO) 406. Bandpass filter (BPF) 408 isolates the frequencies of interest in the IF1 signal. The filtered IF1 signal is down-converted again to a second intermediate frequency (IF2) signal by IF mixer 410 and IF local oscillator 412. The IF2 signal at the output of IF mixer 410 is further filtered by bandpass filter 414 to isolate the frequencies of interest.

Analog programmable gain amplifier (PGA) 416 scales the amplitude of the filtered IF2 signal to match the dynamic range of analog-to-digital converter (ADC) 418. ADC 418 converts the amplified IF2 signal to a sequence of digital samples that are amplified by digital programmable amplifier (PGA) 420. The output of ADC 418 and digital PGA 420 are sampled and analyzed by automatic gain control (AGC) algorithm (ALG) processor 422, which produces a first (analog) gain factor, g1, that adjusts the gain (scale factor) of analog PGA 416 and a second (digital) gain factor, g2, that adjusts the gain of digital PGA 420. The sample rate and phase of ADC 418 are controller by sample clock 424.

Next, the amplified digitized IF2 signal from PGA 420 is applied to the inputs of mixer 430 and mixer 432. Numerically controlled oscillator (NCO) algorithm block 434 produces a first reference signal that is applied to mixer 430 and a second reference signal that is phase-shifted 90 degrees with respect to the first reference signal and applied to mixer 432. The output of mixer 430 is the digital baseband in-phase (I) signal and the output of mixer 432 is the digital baseband quadrature (Q) signal. Low pass filter (LPF) 436 filters high-frequency noise from the digital baseband I signal and LPF 438 filters high-frequency noise from the digital baseband Q signal.

The I and Q signals comprise the input signal, $Y_K$, that is applied to fractionally-spaced (2/T) feedforward (FF) equalization filters 440. Feedforward equalization filters 440 comprises an even FF filter and an odd FF filter that are implemented as a single frequency domain block filter using a Fast Fourier Transform (FFT). Feedforward equalization filter 440 produces the complex output components, Z1 and Z2, which are combined by summer 450 to produce the slicer input signal, $Z_K$. Slicer 452 quantizes the signal levels in the $Z_K$ signal to recover the sequence of symbols, $X'_K$. The $X'_K$ symbol sequence is further processed to recover the bits and words in the original data stream.

Control of functions such as timing, phase, channel estimation, preamble processing, and the like, are performed by timing-phase recover algorithm processor 456, sparse (1/T) post decision feedback (FB) rake filter 458, fast channel estimation processor 460, and preamble channel estimation and phase rotation processor 442. Post-decision feedback rake filter 458 operates in the time domain using a sparsely populated coefficient vector to minimize computation without sacrificing the ability to compensate for large multipath delays.

In an advantageous embodiment of the present invention, the air interface of equalizer-demodulator 400 uses time division duplex (TDD) bursts that support FFT block-size preambles. The preambles comprises constant amplitude zero auto-correlation (CAZAC) phase shift keying (PSK) training sequences. In the exemplary embodiment, the preamble, P, need not be sent with every subscriber uplink data burst, but only as requested by the media access control (MAC) layer of transceiver base station 110. The MAC layer of transceiver base station 110 uses the uplink map field in the downlink header which commands the subscriber transceiver to transmit the uplink data burst.

According to an advantageous embodiment of the present invention, the request sent by the MAC layer is based on the channel estimation accuracy and fade tracking requirements. The raw channel estimation (i.e., channel snapshot, $h_{ss}$) is a cross-correlation of the preamble, P, and the received data, R, associated with P (i.e., $h_{ss}$=CC(P,R)). Cross-correlation is performed using an FFT algorithm. In an exemplary embodiment of the present invention, the received data vector, R, used by the MAC layer is optionally a block average (or a lossy average) of raw data vectors received during the preamble. In a preferred embodiment of the present invention, transceiver base station 110 sends the CAZAK PSK preamble at the start of every data burst. The snapshot channel estimates, $h_{ss}$, from the MAC layer are used to compute the high fidelity (noise reduced) channel estimate, $h_{hifi}$, using a channel tap signal-to-noise (SNR) approximation to the ideal Wiener channel estimation filter.

Preamble channel estimation and phase rotation processor 442 processes each CAZAK PSK preamble to estimate the carrier phase rotation, $\Phi_C$, from the beginning to the end of the preamble and uses this estimate to compute the carrier frequency offset, $\Delta F_C$, for feedback control of numerically controlled oscillator (NCO) algorithm block 434. NCO algorithm block 434 establishes the baseband in-phase and quadrature (I and Q) signals. NCO algorithm block 434 is gradually adjusted based on the $\Delta F_C$ estimate to remove the carrier frequency offset. In an advantageous embodiment of the present invention:

$\Delta F_C = \Phi_C/(2\Pi \times TDP)$, where TDP is the time duration of the preamble. Furthermore, in an advantageous embodiment of the present invention:

$\Phi_C = \min(\arg(\text{sum }(P*R))$.

As noted above, the present invention employs binary FFT length 2/T fractionally spaced feedforward filters. In an advantageous embodiment of the present invention, the filter are 16 symbols in duration, which is a computationally efficient length that provides robust channel matching capability. The filters provide 2/T fractionally spaced feedforward filtering for 16 symbol blocks using a radix 4 64 point complex FFT.

The high fidelity channel estimate, $h_{hifi}$, the $\Delta F_C$ estimate and the $\Delta \Phi_S$ estimate from preamble channel estimation and phase rotation processor 442 are used to compute the coefficients (W) of feedforward equalization filter 440 and the coefficients (b) of post-decision feedback rake filter 458 using a computationally efficient algorithm. Post-decision feedback rake filter 458 is a time domain filter employing a much longer delay line (N delay taps) than the number of feedback coefficients actually used. This design is similar to that of a rake receiver and allows the delay spread that can be covered to be conservative (e.g., 16+N delay taps+1 symbols)

Equalizer-demodulator 400 provides the required high performance demodulation of burst transmissions in multiple dynamic multipath environments. The channel estimates are retained and updated consistent with the cyclo-stationary operation of the TDD frame. Ideally, equalizer-demodulator 400 is coupled with the structure of the TDD air interface of the wireless communications system. The air interface specifies that all subscriber transmission bursts have durations (i.e., number of symbols) equal to an integer number of FFT blocks. In an advantageous embodiment, equalizer-demodulator 400 is coupled with the air interface such that the TDD bursts support FFT block size preambles. The inclusion of the preamble in the subscriber uplink is optional and under the command of the base station. This allows equalizer-demodulator 400 in transceiver base station 110 to track the multipath channels of individual subscribers while minimizing the preamble overhead.

FIG. 5A illustrates exemplary time division duplex (TDD) frame 500 according to one embodiment of the present invention. FIG. 5B illustrates exemplary transmission burst 520 containing a frame with a single FEC block according to one embodiment of the present invention. FIG. 5C illustrates exemplary transmission burst 530 containing a frame with multiple FEC blocks according to one embodiment of the present invention.

TDD frame 500 comprises a downlink portion containing preamble field 501, management field 502, and N modulation groups, including modulation group 503 (labeled Modulation Group 1), modulation group 504 (labeled Modulation Group 2), and modulation group 505 (labeled Modulation Group N). TDD frame 500 also comprises an uplink portion containing transmitter-transmitter guard (TTG) slot 506, 0 to N registration (REG) minislots 507, 1 to N contention (CON) request minislots 508, N sub-burst slots, including sub-burst slot 509 (labeled Sub-Burst 1) and sub-burst slot 510 (labeled Sub-Burst N), and receiver-transmitter guard (RTG) slot 511.

Transmission burst 520 comprises physical media dependent (PMD) preamble field 521, MAC header field 522, data packet data unit (PDU) field 523, and block character redundancy check (CRC) field 524. Transmission burst 530 comprises physical media dependent (PMD) preamble field 531, MAC header field 532, data PDU field 533, block CRC field 534, data PDU field 535, block CRC field 536.

The start of every frame includes a Start-Of-Frame (SOF) field and a PHY Media Dependent Convergence (PMD) field. PMD preambles are used to assist in synchronization and time-frequency recovery at the receiver. The SOF field allows subscribers using fixed diversity to test reception conditions of the two diversity antennas.

The SOF PMD field is 32 symbols long and consists of two back-to-back 16-bit pseudorandom noise (PN) code sequences that are transmitted at 0 degree and 180 degree phase transitions. The SOF field is followed by downlink management messages broadcast from the base station to all subscribers using the lowest modulation or FEC index and orthogonal expansion. Management messages are transmitted both periodically (N times per hyperframe) and as required to change parameters or allocate parameters. Management messages include:

1. DownLink Map indicating the physical slot (PS) where downstream modulation changes (transmitted every frame);

2. UpLink MAP indicating uplink subscriber access grants and associated physical slot start of the grant (transmitted when changed and at a minimum of one second hyperframe periods (shorter periods are optional));

3. TDD frame and physical layer attributes (periodic at a minimum of one second hyperframe period); and 4. Other management messages including ACK, NACK, ARQ requests, and the like (transmitted as required).

The downlink management messages are followed by multi-cast and uni-cast bursts arranged in increasing modulation complexity order. The present invention introduces the term "modulation group" to define a set of downstream bursts with the same modulation and FEC protection. A subscriber continuously receives all the downstream data in the TDD frame downlink until the last symbol of the highest modulation group supported by the link is received. This allows a subscriber maximum time to perform receive demodulation updates.

The downlink-to-uplink transition provides a guard time (TTG) to allow for propagation delays for all the subscribers. The TTG position and duration is fully programmable and set by management physical layer attribute messages. The TTG is followed by a set of allocated contention slots that are subdivided between acquisition uplink ranging mini-slots and demand access request mini-slots. The Uplink MAP message establishes the number and location of each type of slot. Ranging slots are used for both initial uplink synchronization of subscribers performing net entry and for periodic update of synchronization of active subscribers. Contention slots provide a demand access request mechanism to establish subscriber service for a single traffic service flow. As collisions are possible, the subscriber uses random back-off, in integer TDD frame periods and retries based on a time out for request of service. Contention slots use the lowest possible modulation, FEC, and orthogonal expansion supported by the base station.

The contention slots are followed by individual subscriber transmissions (sub-bursts) that have been scheduled and allocated by the base station in the uplink MAP. Each subscriber transmission burst is performed at the maximum modulation, FEC, and orthogonal expansion supported by the subscriber. Finally, the subscriber transmissions are followed by the uplink-to-downlink transition which provides a guard time (RTG) to allow for propagation delays for all the subscribers. The RTG duration is fully programmable and set by management physical layer attribute messages.

In the downlink, the Physical Media Dependent (PMD) burst synchronization is not used. The transmission burst begins with the MAC header and is followed by the packet data unit (PDU) and the associated block CRC field that protects both the PDU and the header. The PDU may be a complete packet transmission or a fragment of a much larger message. When a channel requires more robust FEC, the PDU may be broken into segments that are protected by separate FEC CRC fields. This avoids wasting bandwidth with additional MAC headers.

One significant difference between the uplink and the downlink is the addition of the PMD preamble. The PMD preamble length and pattern can be programmed by transceiver base station 110. Like the SOF field at the beginning of the TDD Frame, the preamble provides a synchronization method for the base station receiver. Uplink registration and ranging packet bursts use longer PMD preambles.

Although the present invention has been described in detail, those skilled in the art should understand that they can make various changes, substitutions and alterations herein without departing from the spirit and scope of the invention in its broadest form.

What is claimed is:

1. For use in a base station (BS) of a fixed wireless network capable of communicating with a plurality of subscriber transceivers via time division duplex (TDD) channels, a BS transceiver comprising:

a receiver front-end capable of receiving data burst transmissions from said plurality of subscriber transceivers in an uplink portion of a TDD channel, wherein said receiver front-end demodulates said received data burst transmissions into a digital baseband signal in-phase I signal and a digital baseband quadrature (Q) signal;

a first frequency domain feedforward equalization filter capable of receiving said I signal and performing a Fast Fourier Transform on a block of N symbols in said I signal to produce a first symbol estimate sequence;

a second frequency domain feedforward equalization filter capable of receiving said Q signal and performing a Fast Fourier Transform on a block of N symbols in said Q signal to produce a second symbol estimate sequence;

an adder capable of receiving said first symbol estimate sequence on a first input and said second symbol estimate sequence on a second input and producing a combined symbol estimate sequence;

a slicer capable of receiving and quantizing said combined symbol estimate sequence to produce a sequence of decided symbols; and a time domain RAKE feedback filter capable of receiving said sequence of decided symbols and generating a symbol correction sequence that is applied to a third input of said adder.

2. The BS transceiver as set forth in claim 1 wherein said first frequency domain feedforward equalization filter is 2/T fractionally spaced, where T is a period of said block of N symbols.

3. The BS transceiver as set forth in claim 2 wherein said second frequency domain feedforward equalization filter is 2/T fractionally spaced, where T is a period of said block of N symbols.

4. The BS transceiver as set forth in claim 1 wherein said time domain RAKE feedback filter comprises a delay line comprising D delay taps.

5. The BS transceiver as set forth in claim 4 wherein said time domain RAKE feedback filter uses C feedback coefficients to generate said symbol correction sequence, where C is less than D.

6. The BS transceiver as set forth in claim 5 wherein said first and second frequency domain feedforward eaualization filters are 2/T fractionally spaced, where T is a period of said block of N symbols.

7. The BS transceiver as set forth in claim 1 further comprising a channel estimation circuit capable of detecting a preamble sequence of symbols in at least one of said I and Q signals and produeing therefrom a first plurality of feedforward coefficients usable by said first frequency domain feedforward equalization filter.

8. The receiver as set forth in claim 7 wherein said channel estimation circuit produces a second plurality of feedforward coefficients usable by said first frequency domain feedforward equalization filter.

9. The receiver as set forth in claim 1 wherein N=16.

10. A fixed wireless network comprising:

a plurality of base stations capable of communicating with a plurality of subscriber transceivers via time division duplex (TDD) channels, each said base station having a base station (BS) transceiver comprising:

a receiver front-end capable of receiving data burst transmissions from said plurality of subscriber transceivers In an uplink portion ofa TDD channel, wherein said receiver front-end demodulates said received data burst transmissions into a digital baseband signal in-phase (I) signal and a digital baseband quadrature (Q) signal;

a first frequency domain fecdforward equalization filter capable of receiving said I signal and performing a Fast Fourier Transform on a block of N symbols in said I signal to produce a first symbol estimate sequence;

a second frequency dorniun feedforward equalization filter capable of receiving said Q signal and performing a Fast Fourier Transform on a block ofN symbols in said Q signal to produce a second symbol estimate sequence;

an adder capable of receiving said first symbol estimate sequence on a first input and said second symbol estimate sequence on a second input and producing a combined symbol estimate sequence;

a slicer capable of receiving and quantizing said combined symbol estimate sequence to produce a sequence of decided symbols; and a time domain RAKE feedback filter capable of receiving said sequence of decided symbols and generating a symbol correction sequence that is applied to a third input of said adder.

11. The fixed wireless network as set forth in claim 10 wherein said first frequency domain feedforward equalization filter is 2/T fractionally spaced, where T is a period of said block of N symbols.

12. The fixed wireless network as set forth in claim 11 wherein said second frequency domain feedforward equalization filter is 2/T fractionally spaced, where T is a period of said block of N symbols.

13. The fixed wireless network as set forth in claim 10 wherein said time domain RAKE feedback filter comprises a delay line comprising D delay taps.

14. The fixed wireless network as set forth in claim 13 wherein said time domain RAKE feedback filter uses C feedback coefficients to generate said symbol correction sequence, where C is less than D.

15. The fixed wireless network as set forth in claim 14 wherein said first and second frequency domain feedforward equalization filters are 2/T fractionally spaced, where T is a period of said block of N symbols.

16. The fixed wireless network as set forth in claim 10 further comprising a channel estimation circuit capable of detecting a preamble sequence of symbols in at least one of said I and Q signals and producing therefrom a first plurality of feedforward coefficients usable by said first frequency domain feedforward equalization filter.

17. The fixed wireless network as set forth in claim 16 wherein said channel estimation circuit produces a second plurality of feedforward coefficients usable by said first frequency domain feedforward equalization filter.

18. The fixed wireless network as set forth in claim 10 wherein N=16.

* * * * *